United States Patent [19]
Kuragaki et al.

[11] Patent Number: 6,097,119
[45] Date of Patent: Aug. 1, 2000

[54] ELECTRIC STARTER MOTOR

[75] Inventors: Akira Kuragaki; Shigeru Shiroyama, both of Tokyo, Japan

[73] Assignee: Mitsubishi Denki Kabushiki Kaisha, Tokyo, Japan

[21] Appl. No.: 09/396,455

[22] Filed: Sep. 15, 1999

[30] Foreign Application Priority Data

Apr. 12, 1999 [JP] Japan ................................. 11-104163

[51] Int. Cl.[7] ............................. H02K 5/04; H02K 7/10
[52] U.S. Cl. ................................... 310/89; 310/42; 74/6; 74/7 A
[58] Field of Search .............................. 310/89, 91, 67 R, 310/83, 42, 238, 239; 74/6, 7 A, 7 R, 7 E, 7 C, 7 B; 123/179.19, 179.25

[56] References Cited

U.S. PATENT DOCUMENTS

| | | | |
|---|---|---|---|
| 4,938,084 | 7/1990 | Morishita et al. | 74/6 |
| 5,012,686 | 5/1991 | Morishita et al. | 74/7 A |
| 5,038,626 | 8/1991 | Morishita et al. | 74/6 |
| 5,045,737 | 9/1991 | Yamauchi | 310/89 |
| 5,156,057 | 10/1992 | Isozumi | 74/7 E |
| 5,165,293 | 11/1992 | Kittaka et al. | 74/7 A |
| 5,349,319 | 9/1994 | Isozumi et al. | 335/274 |

*Primary Examiner*—Nestor Ramirez
*Assistant Examiner*—Tran Nguyen
*Attorney, Agent, or Firm*—Sughrue, Mion, Zinn, Macpeak & Seas, PLLC

[57] ABSTRACT

The commutator is disposed within the case of the starter motor at the end nearest to the pinion, an arc-shaped recess is formed in the outer circumferential wall of the case radially outside the commutator so as to indent between the brushes, and the electromagnetic switch is accommodated in the arc-shaped recess so as to be positioned radially outside the commutator and between the end surface of a core portion of the armature nearest to the commutator and the end surface of the over-running clutch nearest to the commutator, with the central axis thereof generally parallel to the rotor shaft, and with part thereof positioned radially inside the outer circumferential surface of the starter motor.

2 Claims, 4 Drawing Sheets

ELECTRIC STARTER MOTOR

BACKGROUND OF THE INVENTION

1. Field of the Invention

The present invention relates to an electric starter motor for starting an engine.

2. Description of the Related Art

FIG. 3 is a partial cross-section of a conventional electric starter motor and FIG. 4 is a rear elevation of a conventional electric starter motor.

In FIGS. 3 and 4, the electric starter motor includes: a starter motor 3 for generating torque; a planetary reduction assembly 5 for reducing and outputting the torque from the starter motor 3; an over-running clutch 6 fitted onto an output shaft 4 of the planetary reduction assembly 5; a pinion 7 integrated with the over-running clutch 6 slidably disposed on the output shaft 4; and an electromagnetic switch 9 for controlling the passage of current to the starter motor 3 and for pushing the pinion 7 together with the over-running clutch 6 towards a ring gear 8 of an engine by means of a shift lever 10.

The starter motor 3 includes: a yoke 11 formed into a cylindrical shape having a bottom portion also functioning as an outer frame and a magnetic circuit; permanent magnets 12 disposed at even pitch circumferentially around the inner circumferential surface of the yoke 11; an armature 13 disposed radially inside the permanent magnets 12; a commutator 15 mounted on a rotor shaft 14 of the armature 13; and brushes 17 disposed so as to slide in contact with the commutator 15. A rear bracket 2 fits over the outer circumference of the rear end of the yoke 11, is joined to the yoke 11, and supports the rear end of the rotor shaft 14. Furthermore, a front bracket 1 fits over the outer circumference of the front end of the yoke 11 and is joined to the yoke 11.

The brushes 17 are disposed radially outside the commutator 15 disposed on the rear end of the armature 13, being held in a sidable state by brush holders 16 and constantly pushed against the commutator 15 by brush springs 46.

The planetary reduction assembly 5 is mounted on the front end of the rotor shaft 14, the output shaft 4 thereof being supported by the front bracket 1. The over-running clutch 6 is mounted on the output shaft 4 so as to be able to move in the axial direction and such that rotary motion is transmitted thereto. The shift lever 10 is mounted so as to be able to rotate about an intermediate fulcrum portion 10a, a first end 10b engaging the over-running clutch 6 and a second end 10c being connected to a plunger 20 of the electromagnetic switch 9 mounted in an upper portion of the starter motor 3. Furthermore, packing 18 is fitted into the front bracket 1 so as to support the fulcrum portion 10a of the shift lever 10.

The electromagnetic switch 9 is positioned radially outside the starter motor 3 and the planetary reduction assembly 5, the central axis thereof being disposed generally parallel to the output shaft 4. The electromagnetic switch 9 includes: a switch coil 21 for generating a magnetic force by being supplied an electric current thereto; a frame 22 covering the outside of the switch coil 21 and forming part of a magnetic circuit; a core 23 disposed within the rear end of the switch coil 21 and forming part of the magnetic circuit; the plunger 20 disposed within the switch coil 21 so as to be able to slide freely in the axial direction; a return spring 24 disposed between the core 23 and the plunger 20 to constantly push the plunger 20 towards the front; a hook 25 disposed within the plunger 20 so as to be able to slide freely in the axial direction; a rod 26 disposed at the axial center of the core 23 so as to be able to slide freely in the axial direction; a movable contact 27 mounted on the rear end of the rod 26 for opening and closing the electric current circuit to the starter motor 3; and a pair of fixed contacts 28 disposed opposite the movable contact 27 forming connections to external wiring.

The hook 25 is constantly pushed towards the rear by a lever spring 29. An engaging portion 25a disposed on the end of the hook 25 extending beyond the plunger 20 engages the second end 10c of the shift lever 10. Furthermore, the rod 26 is constantly pushed towards the front by a spring (not shown). In addition, a stopper 31 is mounted on the open end of the plunger 20 to stop the lever spring 29 from dislodging.

Next, the operation of a conventional electric starter motor constructed in the above manner will be explained.

When a key switch (not shown) is closed, current flows through the switch coil 21, whereby the plunger 20 is subjected to the magnetic force generated by the switch coil 21 and is attracted towards the core 23. Consequently, the plunger 20 moves towards the rear (in the direction of arrow A in FIG. 3) against the pushing force of the return spring 24. With the movement of the plunger 20, the hook 25 moves to the rear side. Then, the engaging portion 25a engages the second end 10c of the shift lever 10, and the shift lever 10 rotates counterclockwise in FIG. 3 about the fulcrum portion 10a. The over-running clutch 6 is pressed by the shift lever 10 as it rotates, whereby the over-running clutch 6 and the pinion 7 move together on the output shaft 4 towards the front (in the direction of arrow B in FIG. 3). When the end surface of the pinion 7 comes into contact with the end surface of the ring gear 8, the movement of the over-running clutch 6 and the pinion 7 ceases, but the plunger 20 is attracted and moves further while compressing the lever spring 29 and comes into contact with the rod 26. Then, when the movable contact 27 comes into contact with the fixed contacts 28, the plunger 20 moves further and presses the rod 26 while compressing a spring 30 and stops moving when the end surface of the plunger 20 reaches the end surface of the core 23.

When the movable contact 27 contacts the pair of fixed contacts 28, current flows through lead wires 32, the brushes 17, and the commutator 15 to the armature 13, and the armature 13 rotates. The rotational torque of the armature 13 is transmitted to the output shaft by means of the planetary reduction assembly 5 and the output shaft 4 rotates. At this point, the rotation of the armature 13 is reduced by the planetary reduction assembly 5 and transmitted to the output shaft 4.

With the rotation of the output shaft 4, the pinion 7 also rotates, and when the contact position of the pinion 7 shifts to a position relative to the ring gear 8 where meshing is possible, the over-running clutch 6 and the pinion 7 are pushed out towards the front by the pushing force of the lever spring 29, and the pinion 7 meshes with the ring gear 8. In this manner, the rotational torque of the output shaft 4 is transmitted to the ring gear 8, and the engine is driven.

When the engine has been ignited and the key switch is switched off, the flow of electricity to the switch coil 21 ceases. At that point, the plunger 20 is returned towards the front by the pushing force of the return spring 24 to the state shown in FIG. 3.

In the conventional electric starter motor, because the central axis of the electromagnetic switch 9 is disposed generally parallel to the output shaft 4 radially outside the starter motor 3 and the planetary reduction assembly 5 and is separated by a predetermined distance from the starter motor 3 and the planetary reduction assembly 5 in this manner, one problem has been that the radial dimensions of the electric starter motor have been large, placing significant restrictions on the engine layout during design of the vehicle.

Thus, flattening of the electromagnetic switch has been considered in order to reduce the radial dimensions of the electric starter motor, but in that case one problem has been that special machinery is required, inevitably leading to cost increases.

SUMMARY OF THE INVENTION

The present invention aims to solve the above problems and an object of the present invention is to provide an electric starter motor capable of preventing interference with surrounding auxiliary machinery during mounting on the engine and of improving layout possibilities by changing the arrangement of the starter motor to suppress large dimensions in the radial direction.

In order to achieve the above object, according to one aspect of the present invention, there is provided an electric starter motor which includes a starter motor having an armature secured to a rotor shaft and housed within a cylindrical case, a commutator secured to the rotor shaft so as to be positioned at one end of the armature and housed within the cylindrical case, and a plurality of brushes disposed circumferentially around the outside of the outer circumference of the commutator so as to slide in contact with the commutator and housed within the cylindrical case; an output shaft driven by the rotation of the starter motor; an over-running clutch spline-fitted onto the output shaft; a pinion disposed on the output shaft together with the over-running clutch so as to be able to slide freely in the axial direction for transmitting rotation transmitted by the over-running clutch to a ring gear of an engine; and an electromagnetic switch for pushing the over-running clutch and the pinion together in the direction of the ring gear. The commutator is disposed within the case at the end nearest to the pinion. An arc-shaped recess is formed in the outer circumferential wall of the case radially outside the commutator so as to indent between the brushes. The electromagnetic switch is accommodated in the arc-shaped recess so as to be positioned radially outside the commutator and between the end surface of a core portion of the armature nearest to the commutator and the end surface of the over-running clutch nearest to the commutator so as to be radially outside the commutator, with the central axis thereof generally parallel to the rotor shaft, and with part thereof positioned radially inside the outer circumferential surface of the starter motor.

DETAILED DESCRIPTION OF THE PREFERRED EMBODIMENTS

The preferred embodiments of the present invention will now be described with reference to the drawings.

Embodiment 1

Figure 1:
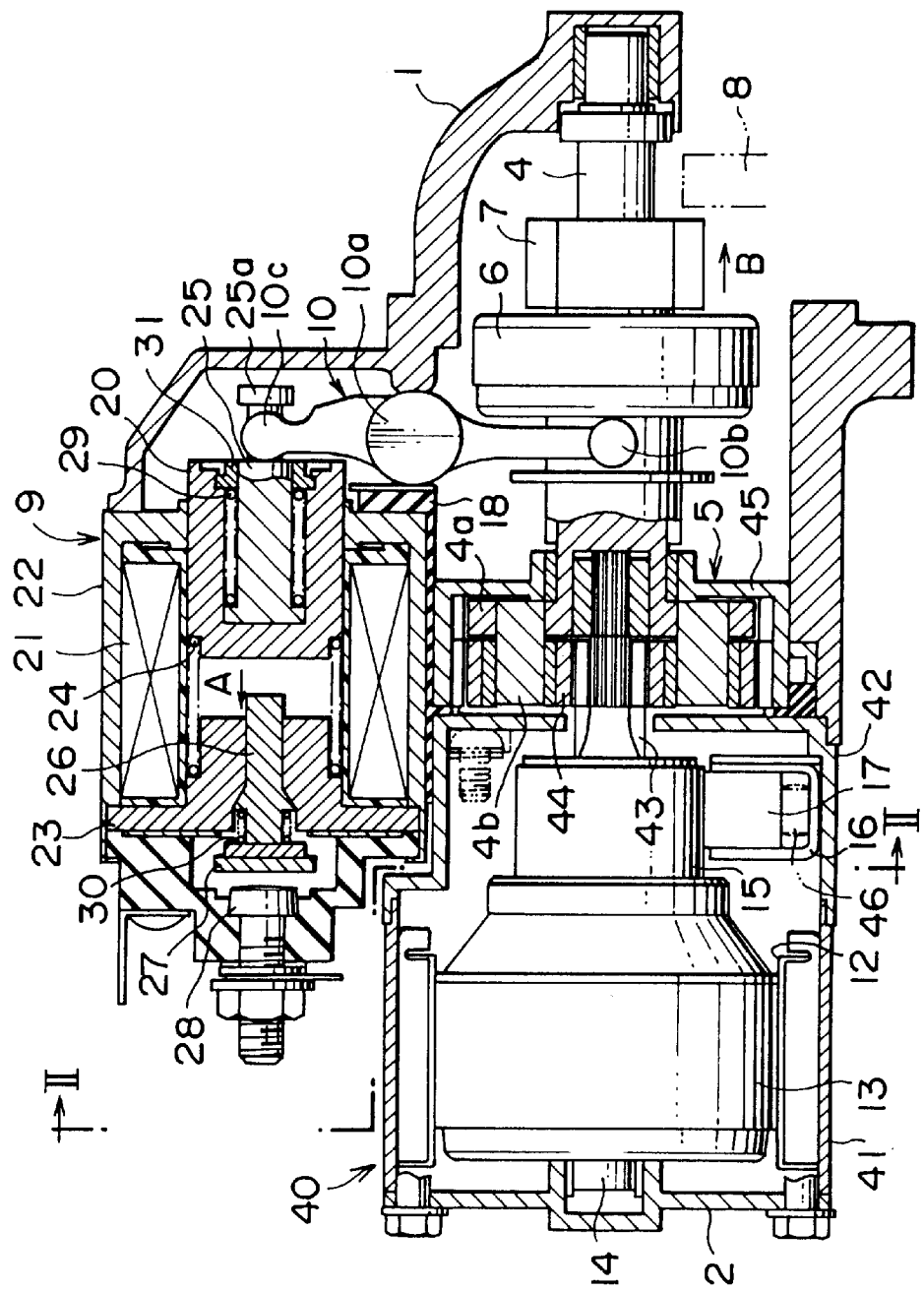
FIG. 1 is a partial cross-section of an electric starter motor according to Embodiment 1 of the present invention.
Figure 2:
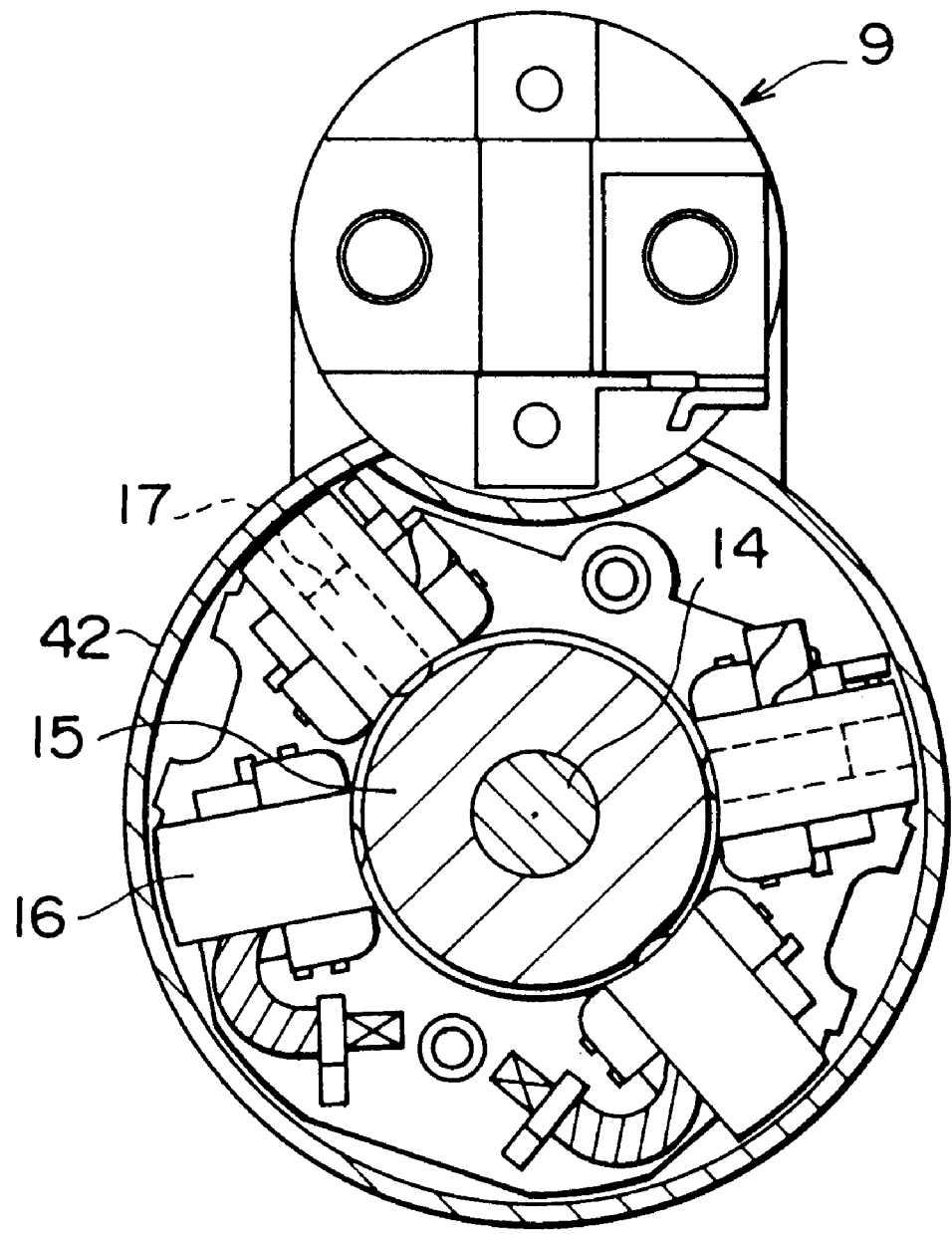
FIG. 2 is cross-sectional view from the direction of the arrows taken along line II—II in FIG. 1.

FIG. 1 is a partial cross-section of an electric starter motor according to Embodiment 1 of the present invention, and FIG. 2 is cross-sectional view from the direction of the arrows taken along line II—II in FIG. 1.

In FIGS. 1 and 2, the electric starter motor includes: a starter motor 40 for generating a torque; a planetary reduction assembly 5 for reducing and outputting the torque from the starter motor 40; an over-running clutch 6 fitted onto an output shaft 4 of the planetary reduction assembly 5; a pinion 7 integrated with the over-running clutch 6 slidably disposed on the output shaft 4; and an electromagnetic switch 9 for controlling the passage of current to the starter motor 40 and for pushing the pinion 7 together with the over-running clutch 6 towards a ring gear 8 of an engine by means of a shift lever 10.

The starter motor 40 includes: a yoke 41 formed into a cylindrical shape as a case also functioning as an outer frame and a magnetic circuit; a center bracket 42 functioning as a case formed into a cylindrical shape having a bottom portion and jointed to the yoke 41 by fitting the open end thereof over the outer circumference of the front end of the yoke 41; permanent magnets 12 disposed at even pitch circumferentially around the inner circumferential surface of the yoke 41; an armature 13 disposed radially inside the permanent magnets 12 having a core portion including a winding housed in a core; a commutator 15 mounted on the end of a rotor shaft 14 nearest to the armature 13 (to the right in FIG. 1); and brushes 17 disposed so as to slide in contact with the commutator 15. A rear bracket 2 fits over the outer circumference of the rear end of the yoke 41, is joined to the yoke 41, and supports the rear end of the rotor shaft 14 (to the left in FIG. 1). Furthermore, a front bracket 1 fits over the outer circumference of the front end of the center bracket 42 and is joined to the center bracket 42.

The brushes 17 are disposed radially outside the commutator 15 disposed on the front end of the armature 13, being held in a slidable state by brush holders 16 and constantly pushed against the commutator 15 by brush springs 46.

The commutator 15 and the brush holders 16 are disposed within the center bracket 42. The front end of the rotor shaft 14 extends through an aperture disposed in the center of the bottom portion of the center bracket 42.

Here, the brushes 17 are disposed circumferentially, as shown in FIG. 2, and a clear space is thus formed between the brushes 17 on the upper side within the center bracket 42. Part of the outer circumferential wall of the center bracket 42 is shaped so as to form an arc-shaped recess indented into the clear space. The arc-shaped recess extends from the rear end of the commutator 15 as far as the front end of the center bracket 42. Furthermore, a notch is formed in the outer circumferential wall of the rear end side of the front bracket 1, so as to fit continuously with the arc-shaped recess formed in the center bracket 42.

The planetary reduction assembly 5 includes: a sun gear 43 formed on the outer circumference of the front end of the rotor shaft 14; a plurality of planet gears 44 meshing with the sun gear 43; and an internal gear 45 meshing with each of the planet gears 44. The sun gear 43 transmits the rotation of the rotor shaft 14 to each of the planet gears 44 by rotating together with the rotor shaft 14. The planet gears 44 are supported by an outer 4a formed on the rear end of the output shaft 4 so as to be able to rotate freely by means of pins 4b secured to the outer 4a, and revolve around the outer circumference of the sun gear 43 while rotating when subjected to the rotation of the sun gear 43. The internal gear 45 is prevented from rotating by the front bracket 1. The rear end of the output shaft 4 fits over the front end of the rotor shaft 14 so as to rotate freely, and the front end thereof is supported by the front bracket 1.

The over-running clutch 6 is mounted on the output shaft 4 so as to be able to move in the axial direction and such that rotary motion is transmitted thereto. The shift lever 10 is mounted so as to be able to rotate about an intermediate fulcrum portion 10a, a first end 10b engaging the over-running clutch 6 and a second end 10c being connected to a plunger 20 of an electromagnetic switch 9 mounted above the starter motor 40. Furthermore, packing 18 is fitted into the notch formed in the front bracket 1 so as to support the fulcrum portion 10a of the shift lever 10.

The lower side of the electromagnetic switch 9 is accommodated in the arc-shaped recess formed in the center bracket 42, the electromagnetic switch 9 being positioned radially outside the starter motor 40 and the planetary reduction assembly 5, the central axis thereof being disposed generally parallel to the output shaft 4. Here, the front end of the electromagnetic switch 9 is accommodated in the notch formed in the front bracket 1 by means of packing 18. The electromagnetic switch 9 includes: a switch coil 21 for generating a magnetic force by being supplied an electric current thereto; a frame 22 covering the outside of the switch coil 21 and forming part of a magnetic circuit; a core 23 disposed within the rear end of the switch coil 21 and forming part of the magnetic circuit; a plunger 20 disposed within the switch coil 21 so as to be able to slide freely in the axial direction; a return spring 24 disposed between the core 23 and the plunger 20 to constantly push the plunger 20 towards the front; a hook 25 disposed within the plunger 20 so as to be able to slide freely in the axial direction; a rod 26 disposed at the axial center of the core 23 so as to be able to slide freely in the axial direction; a movable contact 27 mounted on the rear end of the rod 26 for opening and closing the electric current circuit to the starter motor 40; and fixed contacts 28 disposed opposite the movable contact 27 forming connections to external wiring.

The hook 25 is constantly pushed towards the rear by a lever spring 29. An engaging portion 25a disposed on the end of the hook 25 extending beyond the plunger 20 engages the second end 10c of the shift lever 10. Furthermore, the rod 26 is constantly pushed towards the front by a spring (not shown). In addition, a stopper 31 is mounted on the open end of the plunger 20 to stop the lever spring 29 from dislodging.

Figure 3:
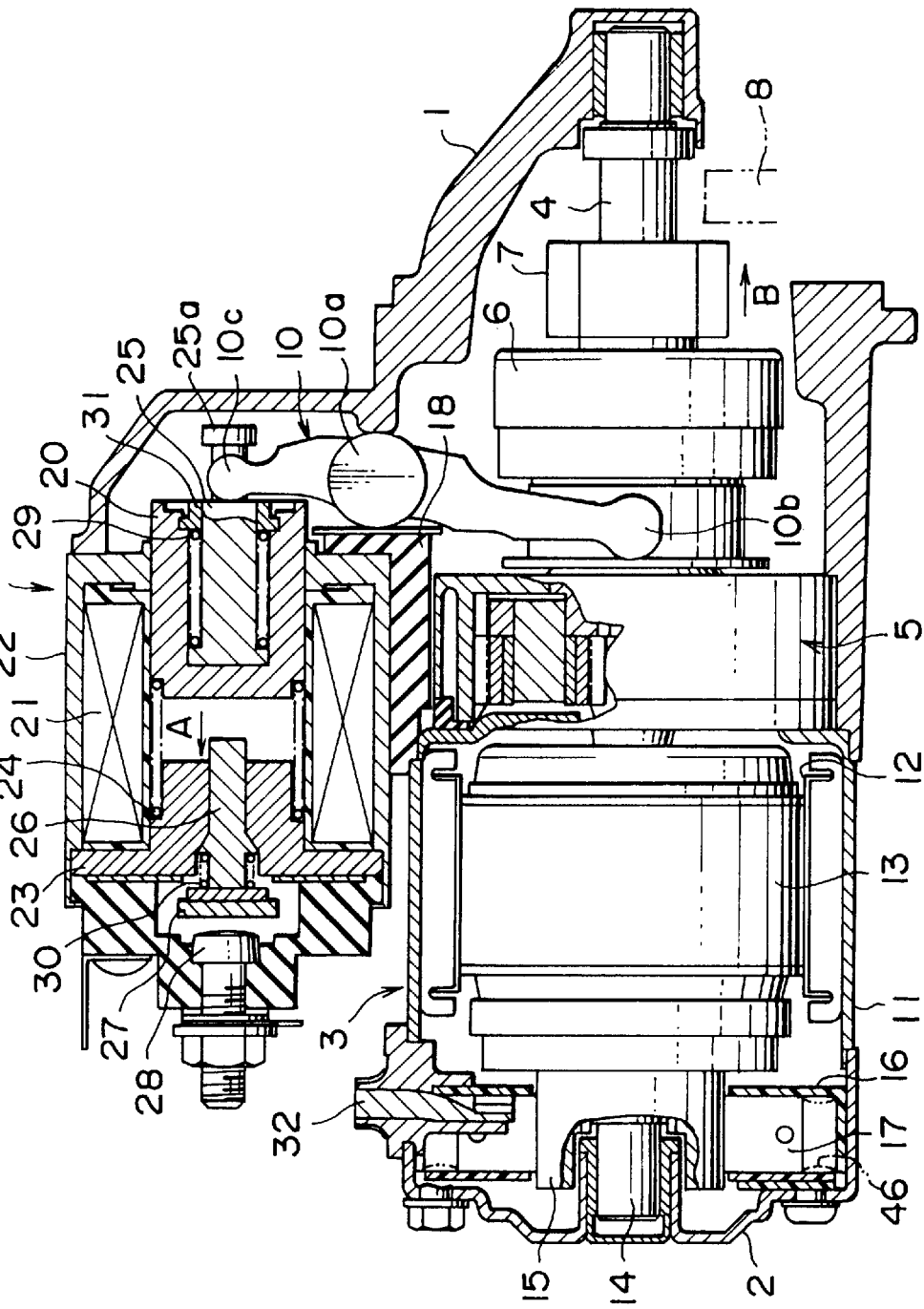
FIG. 3 is a partial cross-section of a conventional electric starter motor.
Figure 4:
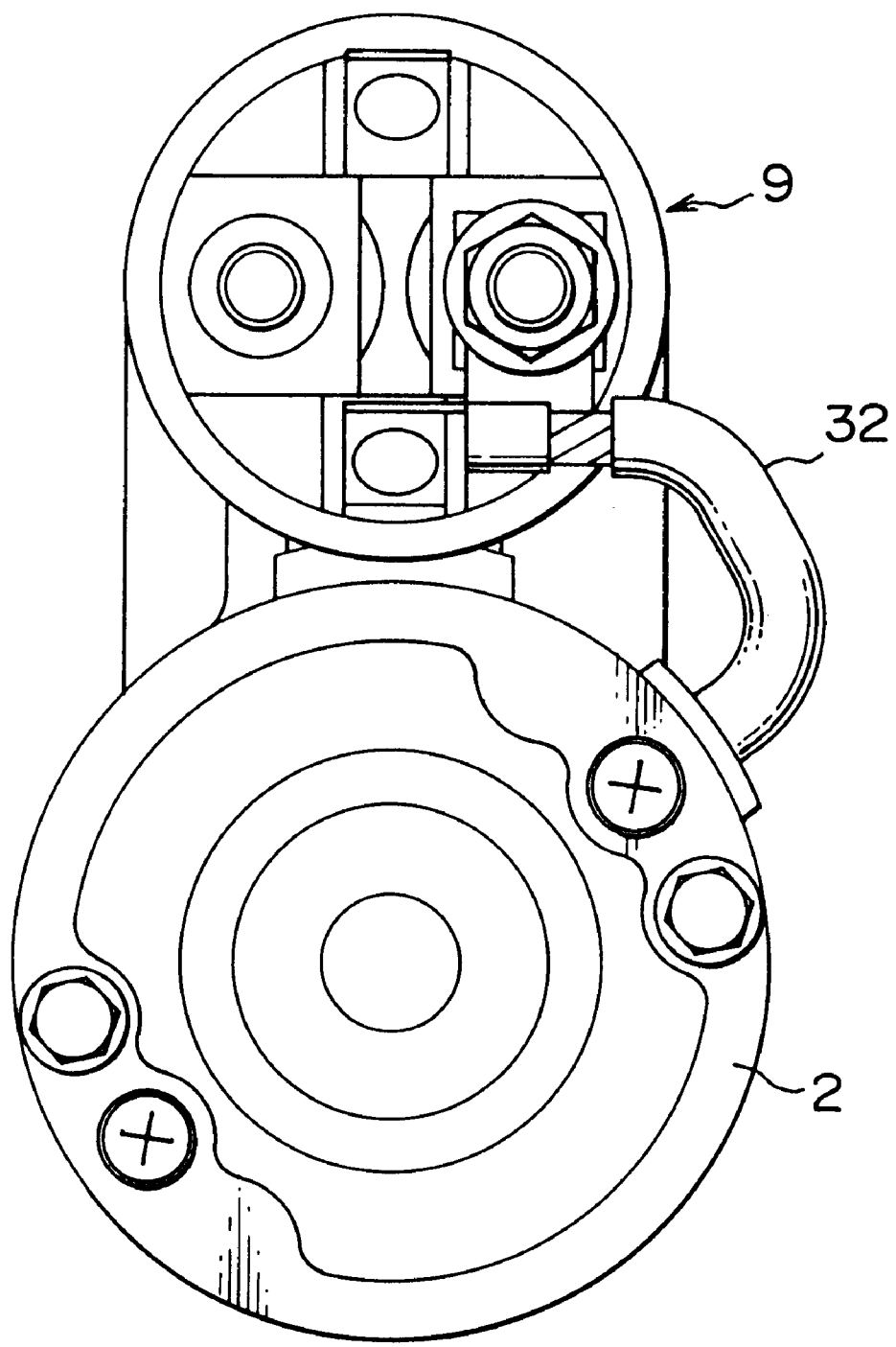
FIG. 4 is a rear elevation of a conventional electric starter motor.

Because an electric starter motor constructed in this manner operates in the same manner as the conventional electric starter motor shown in FIGS. 3 and 4, explanation thereof will be omitted here.

Because the starter motor 40 according to Embodiment 1 has the commutator 15 and the brushes 17 disposed at the end nearest to the planetary reduction assembly 5 in this manner, it is possible to shape the outer circumferential wall of the center bracket 42 so as to form an arc-shaped recess indented into the clear space formed between the brushes 17. Then, because the central axis of the electromagnetic switch 9 is disposed generally parallel to the rotor shaft 14 such that the electromagnetic switch 9 is disposed within the arc-shaped recess, part of the electromagnetic switch 9 is positioned radially inside the outer circumferential surface of the starter motor 40, achieving a reduction in the size of the radial dimensions of the electric starter motor.

Consequently, when mounting the present electric starter motor on an engine, interference between the electric starter motor and surrounding auxiliary machinery is less likely to occur, enabling layout possibilities to be improved.

Furthermore, because the electromagnetic switch 9 is disposed to effectively utilize the clear space formed between the brushes 17, increases in radial dimensions are suppressed and the stationary position of the pinion can also be set to within a range similar to that of a conventional device. The stationary position of the pinion is the distance from the surface mounted to the engine to the tip of the pinion when the electric starter motor is not operating. Since this distance varies from engine to engine, it is advantageous to be able to adapt to a larger range.

Furthermore, because a planetary reduction assembly is provided, the axial dimensions and radial dimensions of the starter motor 40 can be reduced compared to a direct-drive electric starter motor in which the rotor shaft 14 is integrated with the output shaft 4.

Embodiment 2

Whereas Embodiment 1 applies to an electric starter motor having a planetary reduction assembly 5 for transmitting the rotation of a rotor shaft 14 to an output shaft 4, Embodiment 2 applies to a direct-drive electric starter motor in which the front end of the rotor shaft 14 is extended and integrated with the output shaft 4.

The starter motor 40 according to Embodiment 2 also has the commutator 15 and the brushes 17 disposed at the end nearest to the over-running clutch 6. Thus, it is possible to shape the outer circumferential wall of the center bracket 42 so as to form an arc-shaped recess indented into the clear space formed between the brushes 17. Then, because part of the electromagnetic switch 9 is positioned radially inside the outer circumferential surface of the starter motor 40 by disposing the central axis of the electromagnetic switch 9 generally parallel to the rotor shaft 14 such that the electromagnetic switch 9 is disposed within the arc-shaped recess and a reduction in the size of the radial dimensions of the electric starter motor can be achieved, the same effects are exhibited as in Embodiment 1 above. Here, the electromagnetic switch 9 is disposed between the end surface of the core portion of the armature 13 nearest to the commutator and the end surface of the overrunning clutch 6 nearest to the commutator.

The present invention is constructed in the above manner and exhibits the effects described below.

According to the present invention, there is provided an electric starter motor which includes a starter motor having an armature secured to a rotor shaft and housed within a cylindrical case, a commutator secured to the rotor shaft so as to be positioned at one end of the armature and housed within the cylindrical case, and a plurality of brushes disposed circumferentially around the outside of the outer circumference of the commutator so as to slide in contact with the commutator and housed within the cylindrical case; an output shaft driven by the rotation of the starter motor; an over-running clutch spline-fitted onto the output shaft; a pinion disposed on the output shaft together with the over-running clutch so as to be able to slide freely in the axial direction for transmitting rotation transmitted by the over-running clutch to a ring gear of an engine; and an electromagnetic switch for pushing the over-running clutch and the pinion together in the direction of the ring gear. The commutator is disposed within the case at the end nearest to the pinion. An arc-shaped recess is formed in the outer circumferential wall of the case radially outside the commutator so as to indent between the brushes. The electromagnetic switch is accommodated in the arc-shaped recess so as to be positioned radially outside the commutator and between the end surface of a core portion of the armature nearest to the commutator and the end surface of the over-running clutch nearest to the commutator so as to be radially outside the commutator, with the central axis thereof generally parallel to the rotor shaft, and with part thereof positioned radially inside the outer circumferential surface of the starter motor. Consequently, an electric starter motor capable of preventing interference with surrounding auxiliary machinery during mounting on the engine and of improving layout possibilities by suppressing large dimensions in the radial direction is obtained.

Furthermore, because a planetary reduction assembly for reducing and transmitting the rotation of the rotor shaft to the output shaft may be provided, the electromagnetic switch being disposed radially outside the commutator and an internal gear of the planetary reduction assembly, reduction of the size of the motor portion can be planned.

What is claimed is:

1. An electric starter motor comprising:

a starter motor having an armature secured to a rotor shaft and housed within a cylindrical case, a commutator secured to said rotor shaft so as to be positioned at one end of said armature and housed within said cylindrical case, and a plurality of brushes disposed circumferentially around the outside of the outer circumference of said commutator so as to slide in contact with said commutator and housed within said cylindrical case;

an output shaft driven by the rotation of said starter motor;

an over-running clutch spline-fitted onto said output shaft;

a pinion disposed on said output shaft together with said over-running clutch so as to be able to slide freely in said axial direction for transmitting rotation transmitted by said over-running clutch to a ring gear of an engine; and an electromagnetic switch for pushing said over-running clutch and said pinion together in the direction of said ring gear, wherein said commutator is disposed within said case at the end nearest to said pinion, wherein an arc-shaped recess is formed in the outer circumferential wall of said case radially outside said commutator so as to indent between said brushes, and wherein said electromagnetic switch is accommodated in said arc-shaped recess so as to be positioned radially outside said commutator and between the end surface of a core portion of said armature nearest to said commutator and the end surface of said over-running clutch nearest to said commutator, with the central axis thereof generally parallel to said rotor shaft, and with part thereof positioned radially inside the outer circumferential surface of said starter motor.

2. The electric motor according to claim 1 further comprising a planetary reduction assembly and transmitting the rotation of said rotor shaft to said output shaft, wherein said electromagnetic switch is disposed radially outside said commutator and an internal gear of said planetary reduction assembly.

* * * * *